US011271263B2

(12) United States Patent (10) Patent No.: US 11,271,263 B2
Shao et al. (45) Date of Patent: Mar. 8, 2022

(54) OPTIMAL CONTROL LOGIC FOR COOLING POWER IN BATTERY THERMAL MANAGEMENT

(71) Applicant: Baidu USA LLC, Sunnyvale, CA (US)

(72) Inventors: Shuai Shao, Milpitas, CA (US);
Huawei Yang, San Jose, CA (US);
Tianyi Gao, San Jose, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 151 days.

(21) Appl. No.: 16/596,612

(22) Filed: Oct. 8, 2019

(65) Prior Publication Data

US 2021/0104788 A1 Apr. 8, 2021

(51) Int. Cl.
*H01M 10/635* (2014.01)
*H01M 10/613* (2014.01)
*H01M 10/6563* (2014.01)
*H01M 10/627* (2014.01)
*H01M 10/6567* (2014.01)

(52) U.S. Cl.
CPC ....... *H01M 10/635* (2015.04); *H01M 10/613* (2015.04); *H01M 10/627* (2015.04); *H01M 10/6563* (2015.04); *H01M 10/6567* (2015.04); *H01M 2220/10* (2013.01)

(58) Field of Classification Search
CPC ............ H01M 10/613; H01M 10/627; H01M 10/635; H01M 10/6563; H01M 10/6567

USPC .......................................................... 429/62
See application file for complete search history.

(56) References Cited

U.S. PATENT DOCUMENTS

| 2011/0027640 | A1* | 2/2011 | Gadawski | H01M 10/486 429/120 |
| 2015/0037647 | A1* | 2/2015 | Nguyen | B60L 58/26 429/120 |
| 2016/0157388 | A1* | 6/2016 | Belady | G06F 1/26 700/282 |
| 2017/0229747 | A1* | 8/2017 | Jung | H01M 10/6567 |

* cited by examiner

*Primary Examiner* — James M Erwin
(74) *Attorney, Agent, or Firm* — Womble Bond Dickinson (US) LLP (57) ABSTRACT

Thermal management of a backup battery unit for datacenter applications is described. In one embodiment a method includes sending first control signals to a pump and a fan to set default speeds. The method includes collecting a battery discharge current from the battery and an ambient air temperature of the environment proximal to the battery. The method includes calculating an optimal control function based on the battery discharge current and the ambient air temperature. The method also includes determining an adjusted pump speed and an adjusted fan speed based on the optimal control function. The method includes sending the adjusted pump speed to the pump and the adjusted fan speed to the fan. A solution for optimizing the cooling power use of the fan and the pump is proposed and at the same time maintaining thermal conditions of the battery cells under dynamic and static conditions are disclosed.

20 Claims, 7 Drawing Sheets

OPTIMAL CONTROL LOGIC FOR COOLING POWER IN BATTERY THERMAL MANAGEMENT

TECHNICAL FIELD

Embodiments of the present disclosure relate generally to a cooling apparatus and system. More particularly, embodiments of the disclosure relate to thermal management of a battery backup unit installed in a datacenter environment.

BACKGROUND

A battery pack consists of battery cells connected in series, in parallel or, a combination of both. The battery cells generate heat during discharging and charging. The speed of discharging is positively correlated with the heat generated. A cooling system for the battery pack is very important because a higher temperature or a lower temperature may negatively impact the battery performance as well as battery health conditions. Cooling systems may be air based, liquid based, or a combination of air and liquid cooling. Since multiple cells are connected together, a significant difference in internal temperature values can lead to different charging and discharging rates for different cells and thus cause the battery pack performance to deteriorate.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A backup battery unit (BBU) is used as a backup power source or an energy storage device for applications such as data centers. A battery pack consists of battery cells connected in series, in parallel or, a combination of both. The battery cells generate heat during discharging and charging. The speed of discharging is positively correlated with the heat generated. In a particular embodiment, a battery thermal management system may include one or more battery cells immersed in cooling liquid contained in an immersion tank. A cooling system for the battery pack is very important because a higher temperature or a lower temperature may negatively impact the battery performance as well as battery health conditions. Since multiple cells are connected together, a significant difference in internal temperature values can lead to different charging and discharging rates for different cells and thus cause the battery pack performance to deteriorate. Therefore, the battery thermal management system plays a vital role in the design and operation of the battery pack, and has a direct impact on the performance of the battery pack. In addition, a bad design of a thermal system may result in the battery failing to function, such as failure to satisfy the backup time needed. Several conventional battery thermal management systems for cooling electric vehicles exist. These include, for example, the air cooling system, the passive or active liquid system, and the thermos-electric system. However, such systems are insufficient.

Advanced thermal management for battery energy storage in data center applications including immersion cooling may require a dedicated control logic for an optimized controller. Previous attempts to regulate the temperature of a battery in such a scenario have provided cooling control logic with the feedback of battery temperature. These previous attempts have relied on the battery temperature as feedback to then determine the speed of the cooling engines (e.g., fans, pumps, etc.). However, for advanced thermal management systems (e.g., immersion cooling), the thermal mass of the battery or batteries may be relatively high. This may result in the variation of the temperature to be delayed compared to the variation of the heat generated by the battery. This may result in the actual heat experienced by the battery to occur much sooner than what the feedback of the system indicates. The delay in the feedback may cause the battery to become too hot before the system can cool it. A low-latency control algorithm may be necessary to prevent this from occurring.

Embodiments of the present disclosure present a controller with no need of real-time feedback of battery temperature. This reduces latency significantly. Embodiments of the present disclosure introduce a controller to achieve thermal management of one or more battery packs (e.g., backup battery unit) for data center applications. The controller may balance the need for cooling the battery packs with the aim of reducing energy consumption. Energy may be consumed by the two cooling engines: a fan and a pump. The fan may have a fan energy cost and the pump may have a pump energy cost.

The battery or batteries may be used as a backup power source or an energy storage device. The operation of the battery or batteries may have critical requirements such as an upper limit of working temperature. If the temperature of the battery rises above a threshold during discharge, the battery could fail. Thus, during discharge, it is important to cool the battery to prevent its temperature from rising above the threshold. The battery thermal management system may (1) extract heat generated by the battery pack; (2) meet the operational requirements of the battery pack; and (3) reduce or minimize the power consumed by the pump and fan. These goals may be accomplished by control logic that allows the pump and the fan to provide required cooling capacity while to minimizing or reducing the power consumption of fan power and pump power. The heat generated by the battery is transferred in to the coolant. The coolant is circulated between a heat exchanger and the battery pack. The heat exchanger is air-cooled, which transfers the heat from the circulating coolant to the air. The battery temperature may need to be maintained below a threshold temperature as the overheating protection. There may be two variables to control: the fan speed and the pump speed. Three constraints may need to be acquired via sensors during operation: battery discharging current, ambient temperature, and, in some embodiments, battery temperature.

According to one embodiment, a controller (e.g., microcontroller) of the battery thermal management system may achieve the above goals by determining that the battery has begun discharging. Upon this determination, the controller may set the fan speed to an initial default fan speed, as well as set the pump speed to an initial default pump speed. The fan may provide cooling air to the battery and the pump may provide cooling liquid to the battery. The controller may then measure or collect the battery discharge current as well as the ambient air temperature near the battery. The controller may then use these data to calculate a control function. The control function may enable the controller to generate one or more control signals that both control the fan and pump speed as well as ensure the pump and fan do not consume an unnecessary amount of energy.

The current disclosure contemplates a battery thermal management system that provides a new controller design based on a thermal and flow characterization of the system, to reach optimal energy cost within the given constraints (e.g., maintaining battery temperature below a threshold temperature). The battery thermal management system may also provide a method for determining a relation between fan speed, pump speed, and battery temperature for a cooling system within the given constraints. Also, the battery thermal management system may accomplish the above without needing any real-time feedback of battery temperature. That is, no real-time feedback of battery temperature is needed for determining the working parameters of the battery thermal management system. Compared to the control methods with temperature feedback, the response time may be significantly lower.

Figure 1:
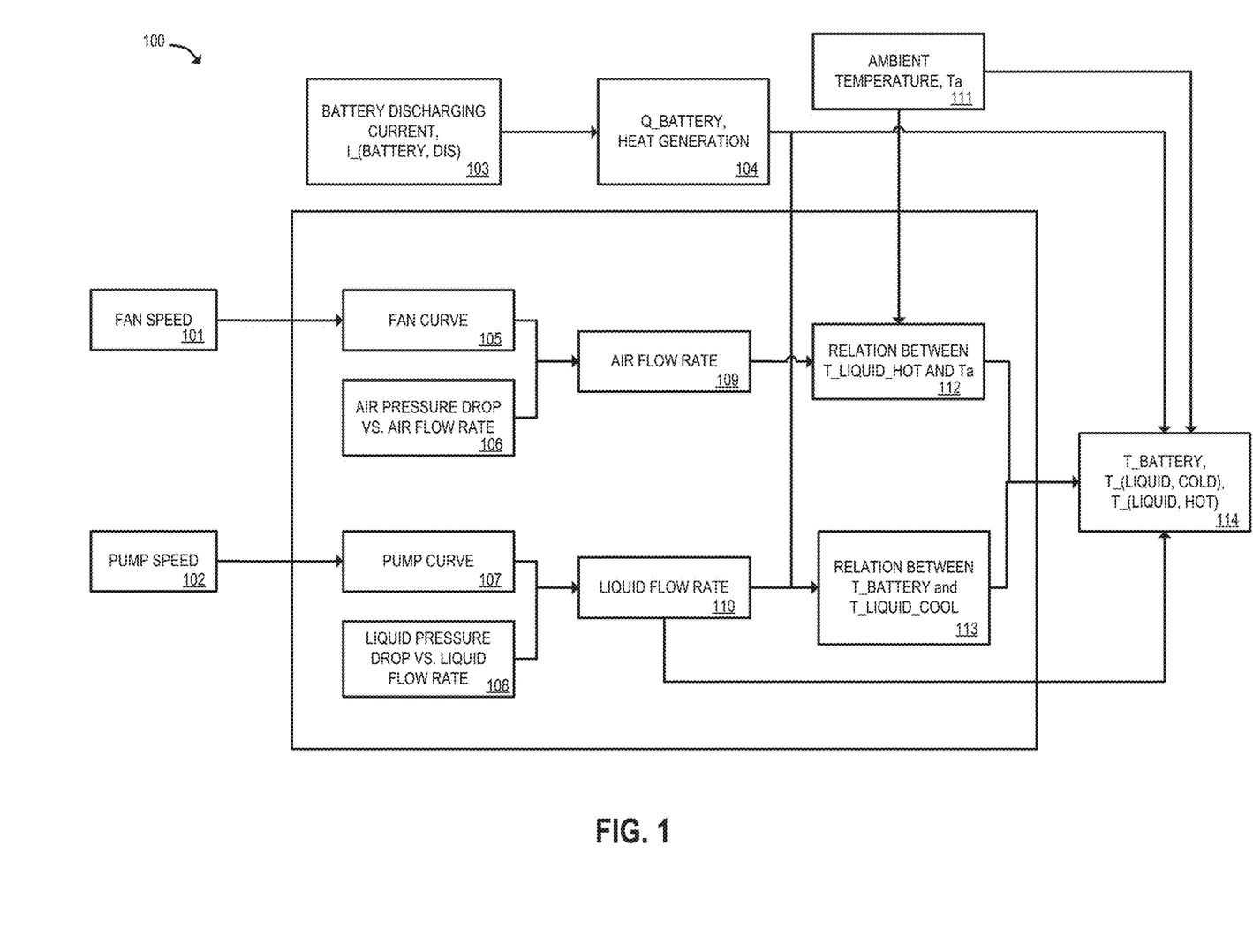
FIG. 1 shows a block diagram illustrating a system for determining battery temperature using fan speed, pump speed, and one or more constraint conditions.

FIG. 1 shows a block diagram illustrating a battery thermal management system 100 for determining battery temperature using fan speed, pump speed, and one or more constraint conditions. FIG. 1 illustrates the relationship between the control variables (i.e., fan speed and pump speed) and the target variable (i.e., battery temperature). Battery thermal management system 100 may have several information blocks 101-114 which contain information that processing logic (e.g., in a controller) may use to determine a control function for controlling fan speed and pump speed. Information blocks 101-114 may include fan speed 101, pump speed 102, battery discharging current 103, Q battery 104 (which may represent the heat generated by the battery), fan curve 105, air pressure drop vs. air flow rate 106, pump curve 107, liquid pressure drop vs. liquid flow rate 108, air flow rate 109, liquid flow rate 110, ambient temperature (Ta) 111, relation between T_Liquid_Hot and Ta 112, relation between T_Battery and T_Liquid_Cool 113, and T_Battery, T(Liquid, Cold), T_(Liquid, Hot) 114. Each of these information blocks will be discussed in more detail below.

The relationship between the control variables (i.e., fan speed and pump speed) and the target variable (i.e., battery temperature) may be derived using a five-step formula. The five-step formula may be used to provide a mathematical expression for the relation between the control variables and the target variable. Before discussing the five-step formula, it may be beneficial to provide a list of nomenclature. Table 1 below provides a list of nomenclature for this disclosure.

TABLE 1

Nomenclature for this disclosure

| Name | Description |
| --- | --- |
| $1_{fan}$ | Fan power, W |
| $P_{pump}$ | Pump power, W |
| T | Temperature, °C. |
| $v_{fan}$ | Fan speed, RPM |
| $v_{pump}$ | Pump speed, RPM |
| $R_{battery}$ | The internal resistance of battery pack, °C./W |
| ε | Heat exchanger effectiveness |
| $C_{min}$ | Smaller of the two fluid stream capacities, fluid capacitance, J/K |
| $c_p$ | Specific heat capacity of fluid stream, J/(kgK) |
| V | Volumetric flow rate, m³/s |
| $A_{device}$ | heat transfer area in the cooling device, m² |
| A | heat transfer area in heat exchanger, m² |
| $h_{l,device}$ | The averaged convective heat transfer coefficient of the cooling device using liquid, W/m²K |
| h | Convective heat transfer coefficient of heat exchanger, W/m²K |
| $R_{th}$ | Thermal resistance of the cooling device, °C./W |
| m | Mass flow rate, kg/s |
| P | Mass density, kg/m³ |
| Subscripts | |
| h | Hot fluid |
| c | Cold fluid |
| max | maximum |
| min | minimum |
| Superscripts | |
| 0 | Reference test case |

In one embodiment, the system runs in a steady state with a known fan speed $v_{fan}^0$ (e.g., fan speed 101), a pump speed $v_{pump}^0$ (e.g., pump speed 102), a battery discharging current $I_{battery,dis}^0$ (e.g., battery discharge current 103) and an air temperature $T_{air}^0$ (e.g., ambient temperature 111), typically in a commission test. It is named "reference test case" in this disclosure. All the working parameters in the reference case can be obtained by using proper sensors, such as air volumetric flow rate $V_{air}^0$ (e.g., air flow rate 109) by anemometer, liquid volumetric flow rate $V_{liquid}^0$ (e.g., liquid flow rate 110) by flow meter, or any other suitable sensor.

In one embodiment, the discharging current 103 of battery and the ambient temperature 111 are considered to be constraint conditions. They can be monitored by sensors implemented in the cooling system. The heat generation 104 from battery Q thus can be determined by the battery discharging current $I_{battery,dis}$ and the internal resistance $R_{battery}$, $$Q_{battery} = I_{battery,dis}^2 R_{battery} \tag{1}$$

Note that the internal resistance of battery remains constant. The reference case may include a formula that looks like, $$R_{battery} = \frac{Q^0_{battery}}{(I^0_{battery,dis})^2} \quad (2)$$

Substituting Equation (2) into Equation (1), the relation between 0 $I_{battery,dis}$ may be expressed as below, $$Q_{battery} = \frac{Q^0_{battery}}{(I^0_{battery,dis})^2} I^2_{battery,dis} \quad (3)$$

If the battery internal resistance is available prior to calculating Equation 2, the data in the reference case may not be needed.

In one embodiment, the working air flow rate 109 and the liquid flow rate 110 may be determined as follows. Affinity law applies to pumps, fans, and hydraulic turbines. In these rotary implements, the affinity law applies to centrifugal and axial flows. Based on the affinity law, once the working parameters ($v_{fan}^0$ and $v_{pump}^0$) in the reference case are obtained, for a different fan speed $v_{fan}$ and a different pump speed $v_{pump}$, the new air volumetric flow rate and liquid volumetric flow rate can be expressed by, $$\frac{v_{fan}}{v_{fan}^0} = \frac{V_{air}}{V_{air}^0} \quad (4)$$

$$\frac{v_{pump}}{v_{pump}^0} = \frac{V_{liquid}}{V_{liquid}^0} \quad (5)$$

The equations above assume fan/pump efficiency remains constant. However, the test data (i.e., $v_{fan}^0$ and $v_{pump}^0$) in reference case may not be needed when the following information is available already: fan performance curve 105 at different fan speeds; pump performance curve 107 at different pump speeds; liquid flow resistance curve 108 of the circulating loop; and air flow resistance curve 106 for the air flow path. The reason for this may be that, given a certain fan speed, the fan performance curve may be determined, which is the relation between air pressure difference and air flow rate travelling though the fan. On the other hand, the cooling system has its own air flow resistance curve, which is also the relation between air pressure difference and air flow. The intersection point of those two curves may determine the working air flow rate 109.

Figure 7:
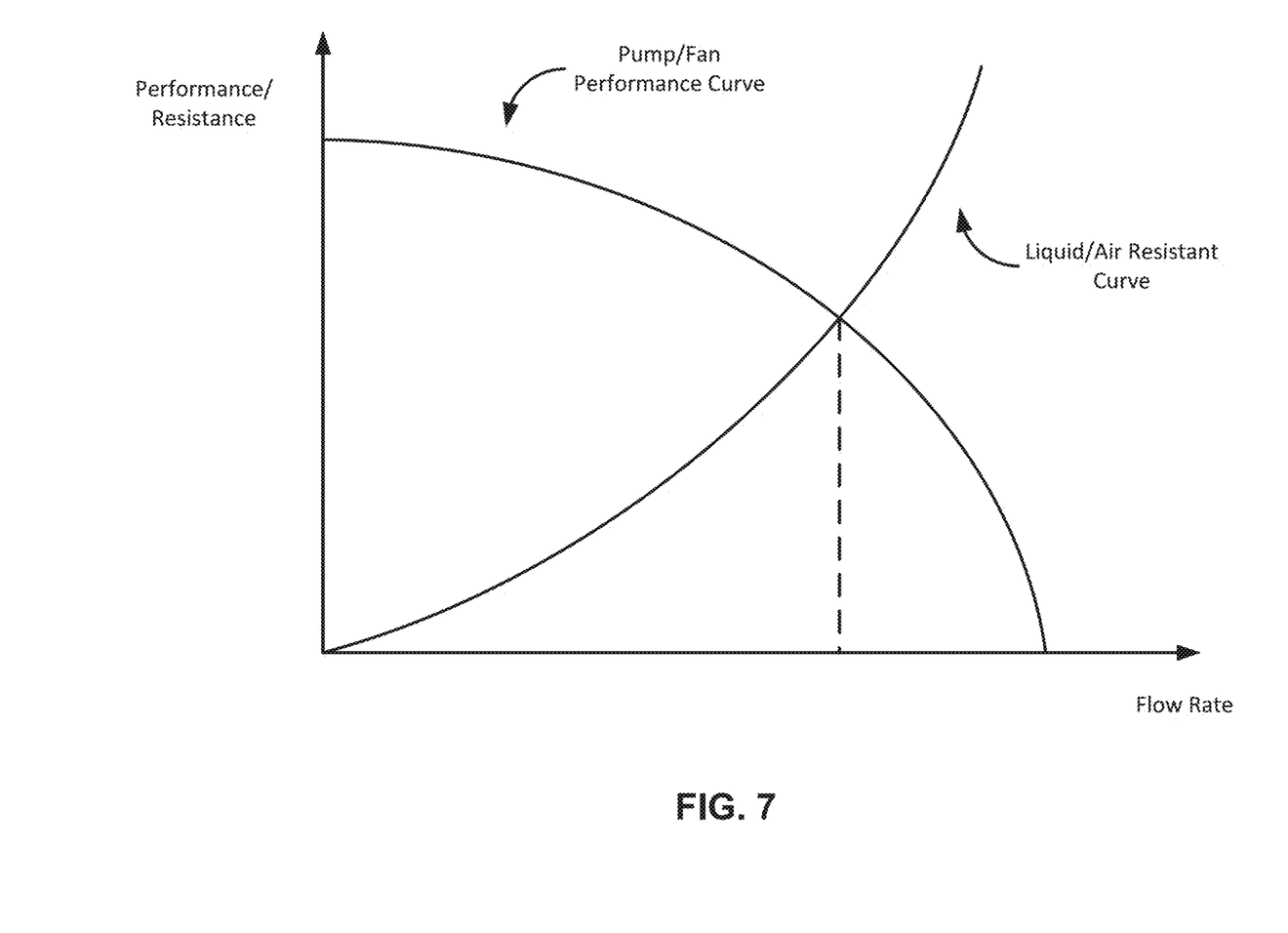
FIG. 7 shows an example pump performance curve and a liquid flow resistant curve in view of example liquid flow rates.

Similarly, given a pump speed, the intersection point of the pump performance curve and liquid flow resistance curve may determine the working liquid flow rate 110. For the purpose of illustration, referring now to FIG. 7, in this example, a pump performance curve and a liquid flow resistant curve are shown in view of the liquid flow rates. Such curves may be associated with a specific type of liquid pumps and provided by a specific pump vendor or manufacturer. The intersection point of the two curves may be utilized to determine the working liquid flow rate. Similar fan performance curve and air flow resistant curve may be utilized to determine the working air flow rate.

In one embodiment, the thermal performance of the battery cooling device (e.g., the battery thermal management system 100) may need to be characterized. The cold liquid temperature $T_{liquid,c}$ is defined for the inflow liquid before the cooling device, meaning the liquid has not extracted the heat generated by the battery yet. Substantially all the heat generated by battery may be absorbed by the circulating coolant. The battery heat generation is expressed as, $$Q_{battery} = \frac{(T_{battery} - T_{liquid,c})}{R_{th}} \quad (6)$$

Here, $R_{th}$ is the thermal resistance of the battery cooling device, which is a monotony decrease function of liquid flow rate $V_{liquid}$. $R_{th}$ represents the thermal resistance of the cooling device, and is determined for a given liquid flow rate. Thus, the relation between battery temperature and cold liquid temperature can be determined.

In the reference case, the thermal resistance of cooling device can be expressed as, $$R_{th}^0 = \frac{T_{battery}^0 - T_{liquid,c}^0}{Q_{battery}^0} = \frac{1}{h_{l,device}^0 A} \quad (7)$$

for a certain pump speed $v_{pump}$, $$R_{th} = \frac{1}{h_{l,device} A_{device}} \quad (8)$$

Heat transfer area in the cooling device A remains constant. The theoretical correlations below are used to relate to the reference case, $$\frac{h_{l,device}}{h_{l,device}^0} = \left(\frac{V_{liquid}}{V_{liquid}^0}\right)^\eta = \left(\frac{v_{pump}}{v_{pump}^0}\right)^\eta. \quad (9)$$

Thus the thermal resistance of the cooling device for an arbitrary pump speed $v_{pump}$ can be expressed as, $$R_{th} = \frac{h_{l,device}^0}{h_{l,device}} R_{th}^0 = \left(\frac{v_{pump}^0}{v_{pump}}\right)^\eta R_{th}^0. \quad (10)$$

For a fully-developed flow, a well-accepted value of η is 0.8. Plugging Equation (10) into Equation (6), then we have the relation as below, $$Q_{battery} = \left(\frac{v_{pump}}{v_{pump}^0}\right)^{0.8} \times \frac{(T_{battery} - T_{liquid,c})}{R_{th}^0} \quad (11)$$

In one embodiment, if the thermal resistance of the cooling device $R_{th}$ for battery is available already, the test data in the reference case may not be needed.

In one embodiment, the thermal performance characterization of the heat exchanger may be determined. The hot liquid temperature $T_{liquid,h}$ is defined for the outflow liquid after the cooling device, meaning the liquid has already extracted the heat generated by the battery. A majority or most of the heat generated by battery is absorbed by the circulating coolant and is rejected to the air. Base on the ε-NTU methodology, the heat transferred from hot liquid to cold air is expressed as below, $$Q_{battery} = \varepsilon C_{min}(T_{liquid,h} - T_{air}), \quad (12)$$

where $$C_{min} = C_{liquid/air} = m_{liquid/air} \times C_{P_{liquid/air}}, \quad (13)$$

For a heat exchanger with a specific design, the value of its effectiveness ε may be determined once the working air flow rate and the working fluid flow rate are given, i.e., $\varepsilon = \varepsilon(V_{air}, V_{liquid})$. $C_{min}$ may also be determined because it is related to material property of fluid or air (i.e., mass density and specific heat capacity) and its flow rate. Thus the relation between hot liquid temperature and ambient temperature may be determined by inputting air flow rate, liquid flow rate and battery heat generation.

We have energy balance equation regarding the temperature difference of hot and cold liquid for the battery heat generation, shown as below, $$Q_{battery} = c_{p,liquid} \times \rho_{liquid} \times V_{liquid} \times T_{liquid,c}) \quad (14)$$

In one embodiment, if the $V_{liquid}$ can be determined in Step 2, the test data in reference case will not be needed. Otherwise, if test data is needed to determine $V_{liquid}$, substituting $V_{liquid}$ with Equation (5), based on affinity law for the pump, leads to an alternative equation as below, $$Q_{battery} = c_{p,liquid} \times \rho_{liquid} \times \frac{V_{liquid}^0}{v_{pump}^0} \times v_{pump} \times (T_{liquid,h} - T_{liquid,c}) \quad (15)$$

Therefore, for a given fan speed $v_{fan}$, a pump speed $v_{pump}$, a battery discharging current $I_{battery,dis}$ and an air temperature $T_{air}$, the battery temperature may be obtained in the following to methods: first, solving Equation (3), (11), (12) and (15) together, the four unknown variables $Q_{battery}$, $T_{battery}$, $T_{liquid,c}$, $T_{liquid,h}$ can be obtained, with the help of test data in the reference case. Second, Equation (1), (6), (12), (14) can be solved together with no need to use the test data, if the following specifications are available: $R_{battery}$, $R_{th}$, pump performance curve, fan performance curve, liquid flow resistance curve of the circulating loop, and air flow resistance curve of the air flow path.

If the first above method is selected, the solution of battery temperature may be expressed as the expression shown below, $$T_{battery} = T_{air} + \quad (16)$$

$$I_{battery,dis}^2 \frac{Q_{battery}^0}{(I_{battery,dis}^0)^2} \left( \frac{1}{\varepsilon(v_{fan}, v_{pump}) \times C_{min}} - \frac{1}{c_{p,liquid} \times \rho_{liquid} \times \frac{V_{liquid}^0}{v_{pump}^0} \times v_{pump}} + \left(\frac{v_{pump}^0}{v_{pump}}\right)^{0.8} R_{th}^0 \right) =$$

$$f_c(v_{fan}, v_{pump}, T_{air}, I_{battery,dis}).$$

If the second above method is selected, the solution of battery temperature may be expressed as the expression shown below, $$T_{battery} = T_{air} + I_{battery,dis}^2 R_{battery}\left(\frac{1}{\varepsilon C_{min}} - \frac{1}{c_{p,liquid}\rho_{liquid}V_{liquid}} + R_{th}\right) = \quad (17)$$

$$f_c'(v_{fan}, v_{pump}, T_{air}, I_{battery,dis}).$$

Both Equation (16) and Equation (17) demonstrate that battery temperature is the function of fan speed, pump speed, air temperature and battery discharging current. For a given battery cooling system, once those four variables are fixed, the battery temperature can be determined.

Note that the battery discharging current and air temperature may be the constraint conditions, which are given by the back-up battery unit and IT room cooling infrastructure. Fan speed and pump speed are the control variables. This may result in the relation between battery temperature $T_{battery}$ and a set of control variables $(v_{fan}, v_{pump})$ being determined by a definite mathematical expression. In some embodiments, multiple control variable sets $(V_{fan}, v_{pump})$ may achieve the same battery temperature.

The overall object function may be the total power consumption of the fan and the pump, as shown below, $$P_{fan} = a_0 v_{fan}^3 + a_1 v_{fan}^2 + a_2 v_{fan} = f_1(v_{fan}) \quad (18)$$

$$P_{pump} = b_0 v_{pump}^3 + b_1 v_{pump}^2 + b_2 v_{pump} = f_2(v_{pump}) \quad (19)$$

The coefficients $a_i$ and $b_i$ (i=0,1,2) may be determined by the fan power curve and pump power curve. If they are not available, the power consumption of fan and pump may be still obtained with the test data in a reference case. Based on the affinity law, we have $$P_{fan} = \left(\frac{v_{fan}}{v_{fan}^0}\right)^3 P_{fan}^0 \quad (20)$$

$$P_{pump} = \left(\frac{v_{pump}}{v_{pump}^0}\right)^3 P_{pump}^0 \quad (21)$$

The above expressions may correspond to relatively rough calculations because it may be assumed that fan/pump efficiency remains constant. Practically, the constraints may be developed to meet the requirements of temperature, fan speed working range, and pump speed working range.

$$T_{battery} \leq T_{battery,max} \quad (22)$$

$$v_{fan,min} \leq v_{fan} \leq v_{fan,max} \quad (23)$$

$$v_{pump,min} \leq v_{pump} \leq v_{pump,max} \quad (24)$$

Applying Equation (17) into Equation (22), the constrain model may be developed as below, $$f_c(v_{fan}, v_{pump}, I_{batter,dis}, T_{air}) - T_{battery,max} \leq 0, \quad (25)$$

with the control variable vector being defined as $$\vec{x} = \begin{pmatrix} v_{pump} \\ v_{fan} \end{pmatrix}$$

The objective function may be defined as $$f_{obj}(\vec{x}) = P_{pump} + P_{fan} \quad (26)$$

The constrains may be converted to a group of inequalities, such as $$\vec{g}(\vec{x}) = \begin{pmatrix} g_1(\vec{x}) \\ g_2(\vec{x}) \\ g_3(\vec{x}) \\ g_4(\vec{x}) \\ g_5(\vec{x}) \end{pmatrix} = \begin{pmatrix} f_0(v_{fan}, v_{pump}, I_{battery,dis}, T_{air}) - T_{battery,max} \\ v_{pump,min} - v_{pump} \\ v_{pump} - v_{pump,max} \\ v_{fan,min} - v_{fan} \\ v_{fan} - v_{fan,max} \end{pmatrix} \leq \vec{0} \quad (27)$$

Therefore, this becomes an optimal controller, to: Minimize the variable: $f_{obj}(\vec{x})$, subject to Formula (27), $\vec{g}(\vec{x}) < \vec{0}$. Since the objective function $f_{obj}(x)$ is a convex function, the controller design may become a convex optimization. Within the bounded range of fan speed and pump speed, there may be a minimizer vector $\vec{x}*$ to let $f_{obj}(\vec{x}*)$ reach the lowest point. When the power of the rack is shut down, the battery starts discharging to provide the backup power. The pump and fan are set at the initial speeds (e.g. maximum speed). Then the micro-controller in in the battery backup unit may collect battery discharging current and air temperature. Having those dynamic constraints parameters, the optimal control function can be generated. The optimal pump speed and fan speed can be obtained. When battery stops discharging, the fan and pump will also stop functioning. This may be accomplished via any suitable method, such as a sensor or a circuit that opens once the battery stops discharging.

Figure 2:
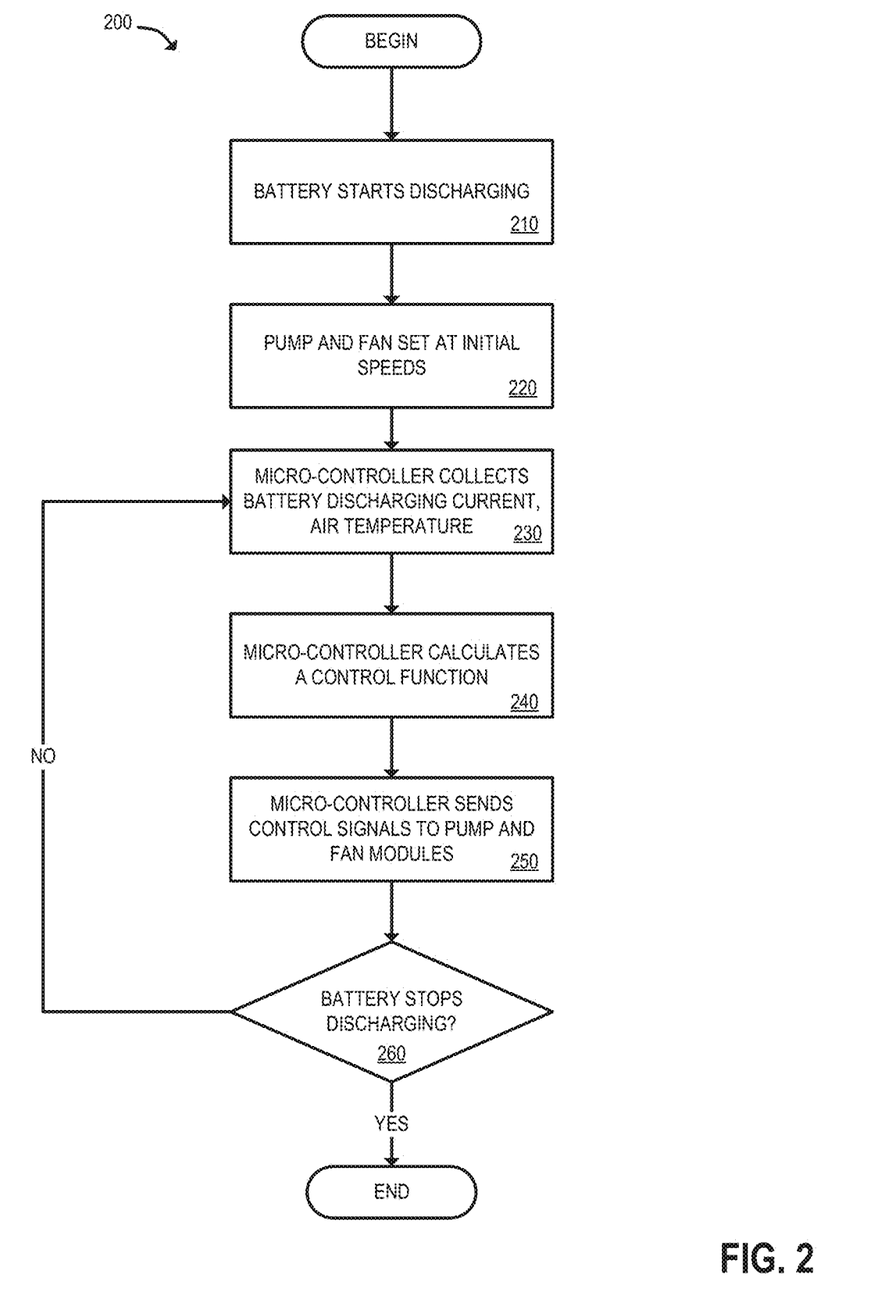
FIG. 2 shows a block diagram illustrating a method for regulating battery temperature during discharge.

FIG. 2 shows a block diagram illustrating a method 200 for regulating battery temperature during discharge. The method 200 is performed by processing logic that may comprise hardware (circuitry, dedicated logic, etc.), software (such as is run on a general-purpose computer system or a dedicated machine), firmware, or a combination thereof. In one embodiment, the method 200 is performed by a controller (or control logic) in the backup battery unit. The method 200 may begin at block 210, where the battery (e.g., backup battery unit) starts discharging. The controller may receive an indication that the battery has begun discharging (not illustrated). At block 220, the processing logic may set the pump and fan at initial speeds. In one embodiment, the processing logic may send a first pump-control signal to a pump to set the pump speed to a default pump speed. Thus, the initial pump speed may be a default pump speed. The processing logic may also send a first fan-control signal to a fan to set the fan speed to a default fan speed. Thus, the initial fan speed may be a default fan speed.

At block 230, the processing logic (e.g., microcontroller) collects battery discharging current and air temperature. Thus, the processing logic may collect a battery discharge current from the battery and an ambient air temperature of the environment proximal to the battery. At block 240, the processing logic calculates a control function that is based at least in part on the battery discharge current and the ambient air temperature. The processing logic may also determine an adjusted pump speed and an adjusted fan speed based on the optimal control function. The adjusted pump speed may be sent in a control signal to the pump. The adjusted fan speed may also be sent in a control signal to the fan. Thus, at step 250, the processing logic may send control signals to the pump and fan, where the control signals are the adjusted pump speed and the adjusted fan speed, respectively. At block 260, the processing logic checks to see if the backup battery unit has stopped discharging. If the backup battery unit has stopped discharging, the method 200 ends. If the backup battery unit has not stopped discharging, the method 200 may return to block 230 and perform block 230 through block 260 until the battery has stopped discharging.

Figure 3:
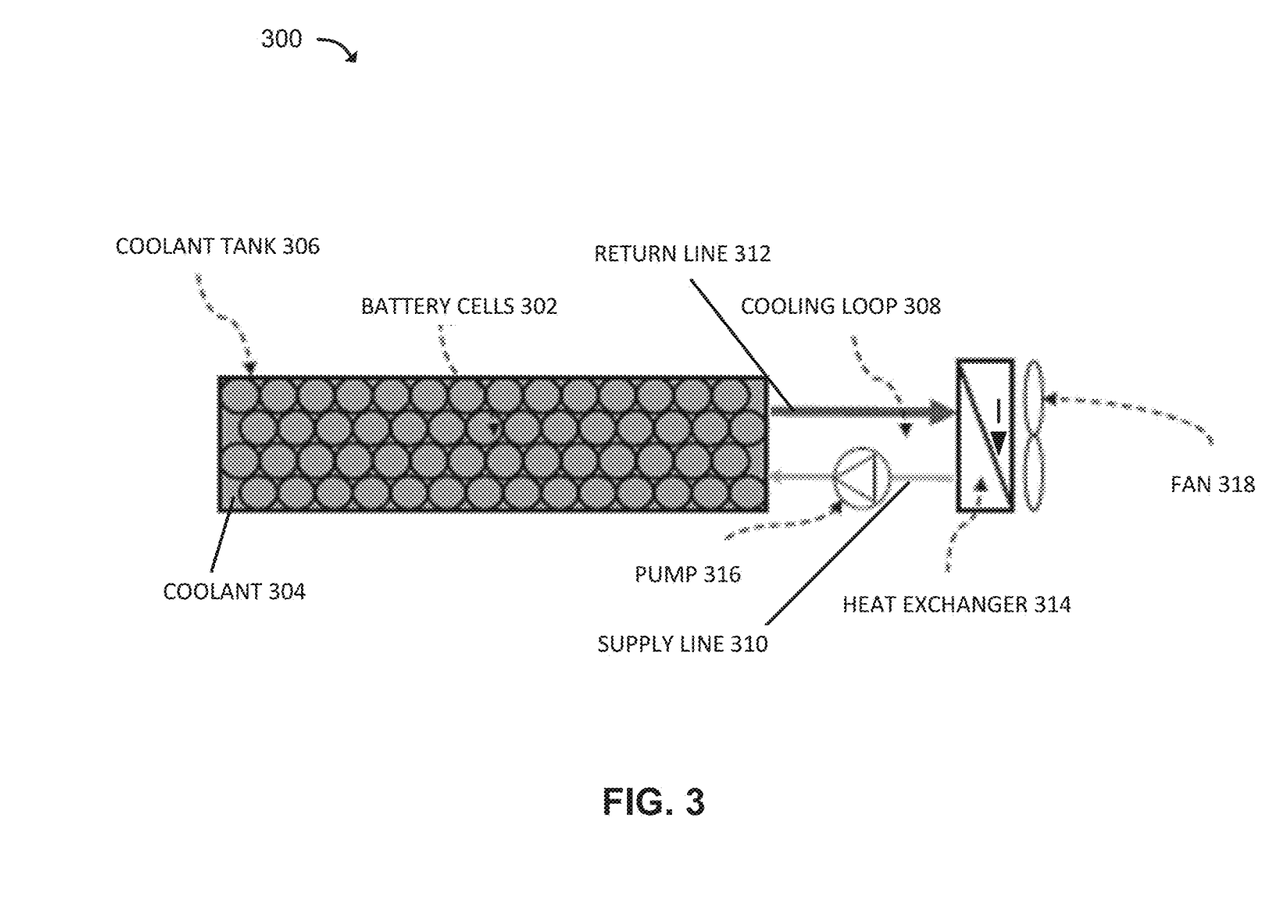
FIG. 3 shows an example of a backup battery module according to one embodiment.

FIG. 3 shows an example of a battery module 300 according to one embodiment. Referring to FIG. 3, battery module 300 includes a number of battery cells 302 submerged in coolant 304 contained in a coolant tank 306. As shown in FIG. 3, battery cells 302 are connected in series-parallel. The cooling loop 308 includes the coolant tank 306 that contains the majority of the coolant fluid 304, a supply line 310, a return line 312, and a cooling device such as a heat exchanger 314. In this embodiment, a fluid pump 316 is disposed on the supply line and is operable to facilitate circulation of the coolant 304. Alternatively, pump 316 may be disposed on the coolant 304. Alternatively, pump 316 may be dispose don the return line 312. The heat exchanger 314 may be either an air-to-liquid heat exchanger or alternatively, heat exchanger 314 can be a liquid-to-liquid heat exchanger.

In one embodiment, a fan 318 is used for moving the air and facilitating the operation of the heat exchanger 314. In one embodiment, data center cooling air (i.e., lower-temperature air centrally supplied in the data center) is used to cool the heat exchanger 314. If a phase change coolant 304 is used, vapor condensation occurs within the heat exchanger 314. The phase change takes place in both the coolant tank 306 and the heat exchanger 314. The fan speed and pump speed may be optimally controlled by a controller using at least certain algorithms as described above for power management purpose.

Figure 4:
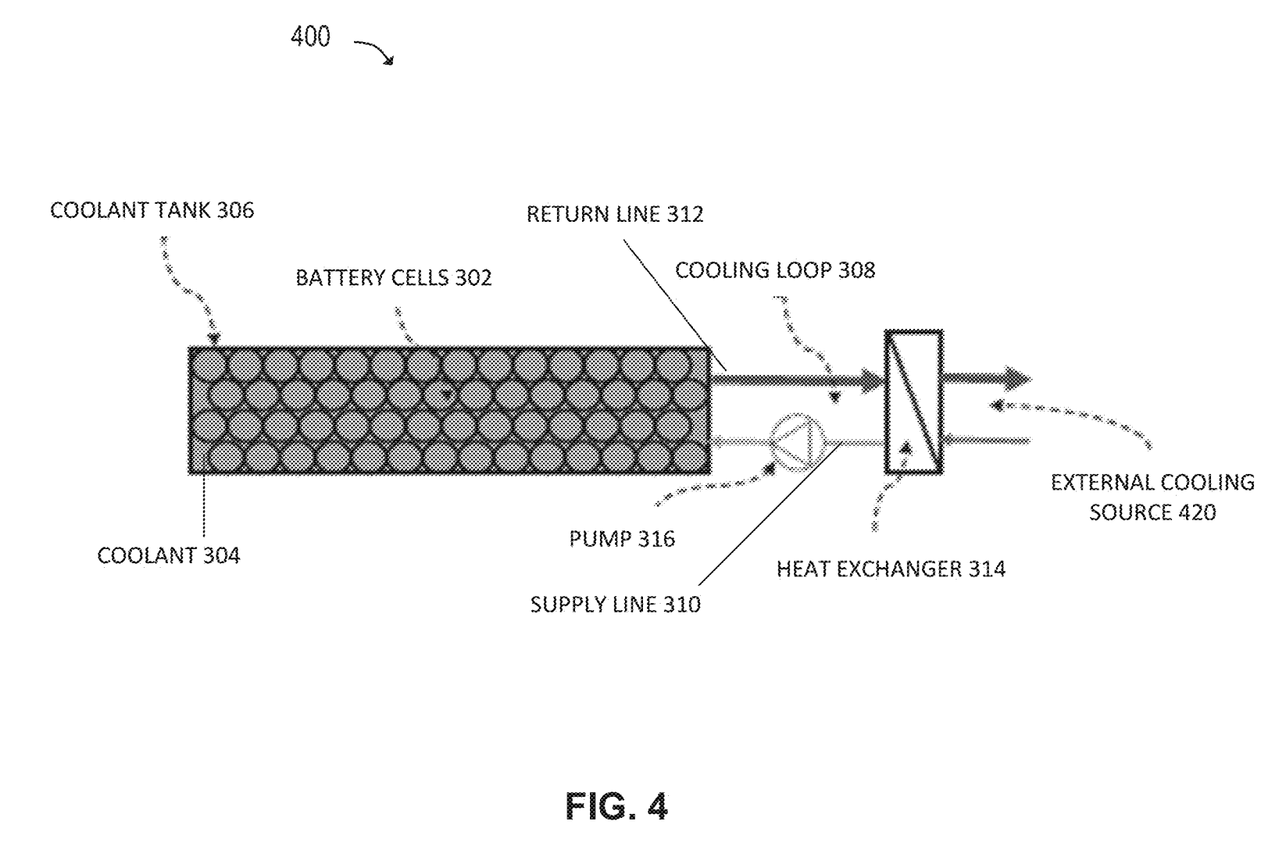
FIG. 4 shows an example of a backup battery module according to another embodiment.

Referring now to FIG. 4, the heat exchanger 314 is connected to an external cooling source 420. In a different embodiment, the external cooling source 420 may be a data center cooling water system or an IT liquid cooling water system. In this example as shown in FIG. 4, heat exchanger 314 is a liquid-to-liquid heat exchanger. The cooling loop between heat exchanger 314 and external cooling source 420 may be referred to as a primary loop, while the cooling loop between heat exchanger 314 and coolant tank 306 may be referred to as a secondary loop. External cooling source 420 may be a part of a rack liquid manifold disposed within an electronic rack in which backup battery module 400 is located or a coolant distribution unit (CDU) located within the electronic rack. When a single phase coolant is used, both the supply and return lines are liquid lines. In the two-phase coolant design, the supply line 310 is a liquid line, while the return line 312 is a vapor line. The diameter of the vapor line may be larger than the diameter of the liquid line. The fan speed and pump speed may be optimally controlled by a controller using at least certain algorithms as described above for power management purpose.

Figure 5:
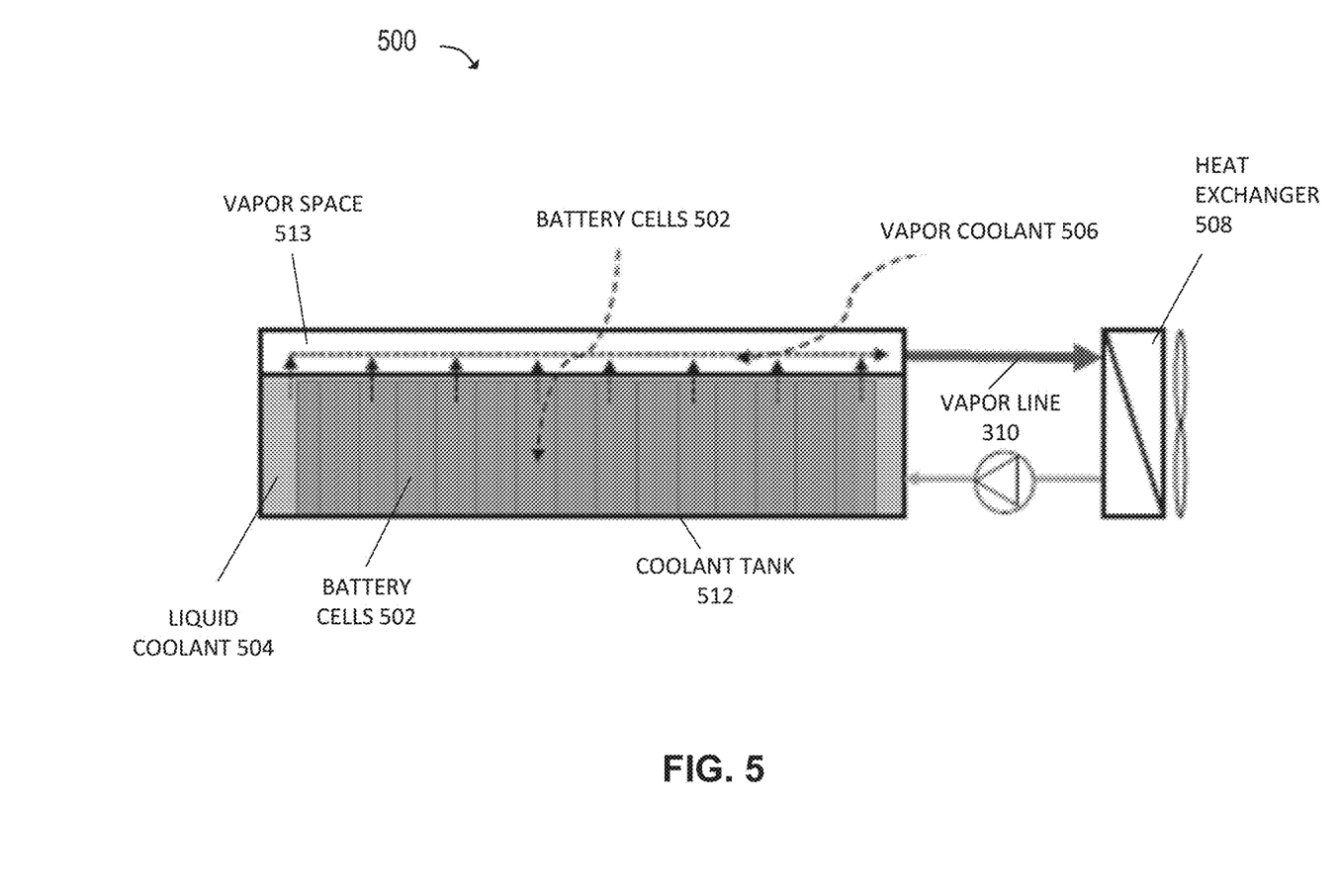
FIG. 5 shows an example backup battery module having a cooling system according to one embodiment.

Referring to FIG. 5, an example backup battery module 500 having a cooling system according to one embodiment is shown. In this embodiment, a two-phase coolant is used. When the battery cells 502 generate heat, the liquid coolant 504 extracts the heat from the battery cells, and the coolant changes from a liquid phase to a vapor phase. The low density vapor coolant 506 ascends in the coolant tank 512 and travels to the heat exchanger 508 through a vapor return line 510. In other words, in this embodiment, the coolant tank 512, which is also a battery chamber, is not fully filled, and a space 513 is reserved toward the top of the coolant tank 512 to allow for the generation of the vapor coolant 506 and to act as a buffer for balancing the pressure differential due to the variation in densities. The fan speed and pump speed may be optimally controlled by a controller using at least certain algorithms as described above for power management purpose.

Figure 6:
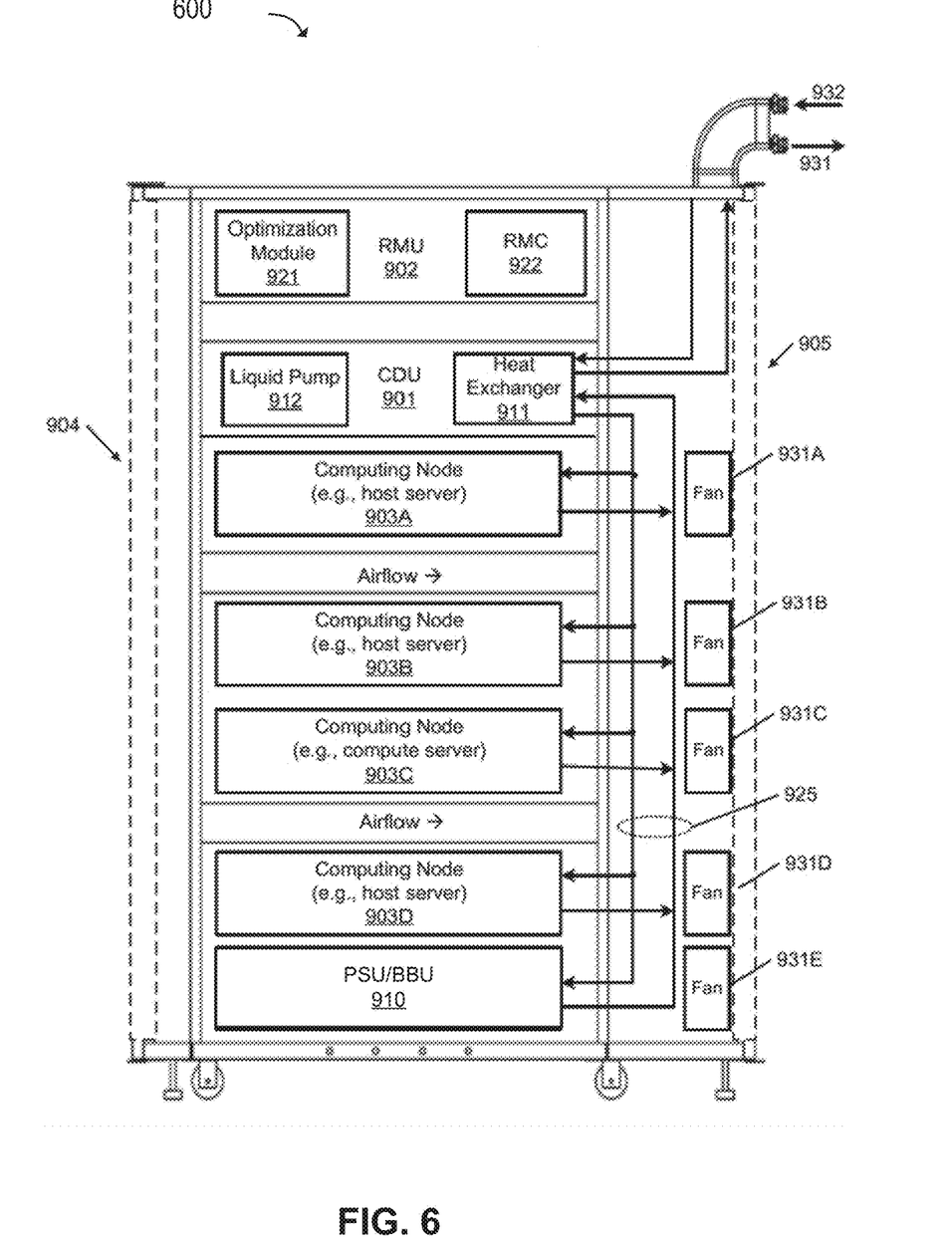
FIG. 6 shows an example of an electronic rack containing a backup battery pack according to one embodiment.

FIG. 6 is a block diagram illustrating an example of an electronic rack 600 according to one embodiment. Electronic rack 600 may include one or more server slots to contain one or more servers respectively. Each server includes one or more information technology (IT) components (e.g., processors, memory, storage devices, network interfaces). Referring to FIG. 6, according to one embodiment, electronic rack 600 includes, but is not limited to, CDU 901, rack management unit (RMU) 902 (optional), a power supply unit (PSU)/BBU 910, and one or more server blades 903A-903D (collectively referred to as server blades 903). Server blades 903 can be inserted into an array of server slots respectively from frontend 904 or backend 905 of electronic rack 600. The PSU 950 and/or BBU 910 may be inserted into any of server slots 903 within the electronic rack 600.

Note that although there are only four server blades 903A-903D shown here, more or fewer server blades may be maintained within electronic rack 600. Also note that the particular positions of CDU 901, RMU 902, PSU/BBU 910, and server blades 903 are shown for the purpose of illustration only; other arrangements or configurations of CDU 901, RMU 902, PSU/BBU 910, and server blades 903 may also be implemented. Note that electronic rack 600 can be either open to the environment or partially contained by a rack container, as long as the cooling fans can generate airflows from the frontend to the backend.

In addition, a fan module can be associated with each of the server blades 903, and PSU/BBU 910. In this embodiment, fan modules 931A-931E, collectively referred to as fan modules 931, and are associated with server blades 903A-903D and PSU/BBU 910 respectively. Each of the fan modules 931 includes one or more cooling fans. Fan modules 931 may be mounted on the backends of server blades 903 and PSU/BBU 910 to generate airflows flowing from frontend 904, traveling through the air space of the sever blades 903, and existing at backend 905 of electronic rack 600.

In one embodiment, CDU 901 mainly includes heat exchanger 911, liquid pump 912, and a pump controller (not shown), and some other components such as a liquid reservoir, a power supply, monitoring sensors and so on. Heat exchanger 911 may be a liquid-to-liquid heat exchanger. Heat exchanger 911 includes a first loop with inlet and outlet ports having a first pair of liquid connectors coupled to external liquid supply/return lines 931-932 to form a primary loop. The connectors coupled to the external liquid supply/return lines 931-932 may be disposed or mounted on backend 905 of electronic rack 600. The liquid supply/return lines 931-932 are coupled to a set of room manifolds, which are coupled to an external heat removal system, or extremal cooling loop. In addition, heat exchanger 911 further includes a second loop with two ports having a second pair of liquid connectors coupled to liquid manifold 925 to form a secondary loop, which may include a supply manifold to supply cooling liquid to server blades 903 and a return manifold to return warmer liquid back to CDU 901. Note that CDUs 901 can be any kind of CDUs commercially available or customized ones. Thus, the details of CDUs 901 will not be described herein. As an example, cooling device 108 shown in FIG. 7 may connect to 925 to complete a full fluid loop.

Each of server blades 903 may include one or more IT components (e.g., central processing units or CPUs, graphical processing units (GPUs), memory, and/or storage devices). Each IT component may perform data processing tasks, where the IT component may include software installed in a storage device, loaded into the memory, and executed by one or more processors to perform the data processing tasks. At least some of these IT components may be attached to the bottom of any of the cooling devices as described above. Server blades 903 may include a host server (referred to as a host node) coupled to one or more compute servers (also referred to as computing nodes, such as CPU server and GPU server). The host server (having one or more CPUs) typically interfaces with clients over a network (e.g., Internet) to receive a request for a particular service such as storage services (e.g., cloud-based storage services such as backup and/or restoration), executing an application to perform certain operations (e.g., image processing, deep data learning algorithms or modeling, etc., as a part of a software-as-a-service or SaaS platform). In response to the request, the host server distributes the tasks to one or more of the performance computing nodes or compute servers (having one or more GPUs) managed by the host server. The performance compute servers perform the actual tasks, which may generate heat during the operations.

Electronic rack 600 further includes optional RMU 902 configured to provide and manage power supplied to servers 903, fan modules 931, and CDU 901. Optimization module 921 and RMC 922 can communicate with a controller in some of the applications. RMU 902 may be coupled to power supply unit 950 to manage the power consumption of the power supply unit. The power supply unit 950 may include the necessary circuitry (e.g., an alternating current (AC) to direct current (DC) or DC to DC power converter, backup battery, transformer, or regulator, etc.) to provide power to the rest of the components of electronic rack 600.

In one embodiment, RMU 902 includes optimization module 921 and rack management controller (RMC) 922. RMC 922 may include a monitor to monitor operating status of various components within electronic rack 600, such as, for example, computing nodes 903, CDU 901, and fan modules 931. Specifically, the monitor receives operating data from various sensors representing the operating environments of electronic rack 600. For example, the monitor may receive operating data representing temperatures of the processors, cooling liquid, and airflows, which may be captured and collected via various temperature sensors. The monitor may also receive data representing the fan power and pump power generated by the fan modules 931 and liquid pump 912, which may be proportional to their respective speeds. These operating data are referred to as real-time operating data. Note that the monitor may be implemented as a separate module within RMU 902.

Based on the operating data, optimization module 921 performs an optimization using a predetermined optimization function or optimization model to derive a set of optimal fan speeds for fan modules 931 and an optimal pump speed for liquid pump 912, such that the total power consumption of liquid pump 912 and fan modules 931 reaches minimum, while the operating data associated with liquid pump 912 and cooling fans of fan modules 931 are within their respective designed specifications. Once the optimal pump speed and optimal fan speeds have been determined, RMC 922 configures liquid pump 912 and cooling fans of fan modules 931 based on the optimal pump speed and fan speeds.

As an example, based on the optimal pump speed, RMC 922 communicates with a pump controller of CDU 901 to control the speed of liquid pump 912, which in turn controls a liquid flow rate of cooling liquid supplied to the liquid manifold 925 to be distributed to at least some of server blades 903. Therefore, the operating condition and the corresponding cooling device performance are adjusted. Similarly, based on the optimal fan speeds, RMC 922 communicates with each of the fan modules 931 to control the speed of each cooling fan of the fan modules 931, which in turn control the airflow rates of the fan modules 931. Note that each of fan modules 931 may be individually controlled with its specific optimal fan speed, and different fan modules and/or different cooling fans within the same fan module may have different optimal fan speeds.

According to one embodiment, PSU/BBU 910 can be implemented as any of the BBUs described above. PSU/BBU 910 includes a regular PSU and a BBU, where the BBU includes an optimal control logic to control the optimal speed of a liquid pump and fan for cooling one or more batteries therein as described above.

Note that some or all of the IT components of servers 903 may be attached to any one of the cooling devices described above, either via air cooling using a heatsink or via liquid cooling using a cold plate. One server may utilize air cooling while another server may utilize liquid cooling. Alternatively, one IT component of a server may utilize air cooling while another IT component of the same server may utilize liquid cooling. In addition, a switch is not shown here, which can be either air cooled or liquid cooled.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method for controlling a pump speed and a fan speed in a battery-cooling system, the method comprising:
   in response to an indication that a battery has begun discharging, sending a first pump-control signal to a pump to set a pump speed to a default pump speed and sending a first fan-control signal to a fan to set a fan speed to a default fan speed;
   determining a battery discharge current from the battery and an ambient air temperature of an environment proximal to the battery;
   determining an adjusted pump speed and an adjusted fan speed using a control function based at least in part on the battery discharge current and the ambient air temperature; and
   sending the adjusted pump speed to the pump and the adjusted fan speed to the fan to modify the pump speed and the fan speed respectively.

2. The method of claim 1, further comprising determining a battery surface temperature of a surface of the battery, wherein the control function is further based on the battery surface temperature.

3. The method of claim 1, further comprising:
   receiving an indication that the battery has stopped discharging; and
   in response to the indication that the battery has stopped discharging, sending control signals to the pump and the fan to stop the pump and the fan from operating.

4. The method of claim 1, wherein the control function comprises a convex function.

5. The method of claim 1, wherein the battery is a battery backup unit in a data center application.

6. The method of claim 1, wherein the control function comprises an objective function that minimizes a sum of the power consumed by the pump and the power consumed by the fan in view of one or more performance constraints.

7. The method of claim 6, wherein the one or more performance constraints comprise maintaining a temperature of the battery below a threshold temperature.

8. A system for providing thermal management to a battery in a data center application, the system comprising:
   a processing device configured to execute instructions to perform battery power management operations, the operations including,
   in response to an indication that a battery has begun discharging, sending a first pump-control signal to a pump to set a pump speed to a default pump speed and sending a first fan-control signal to a fan to set a fan speed to a default fan speed,
   determining a battery discharge current from the battery and an ambient air temperature of an environment proximal to the battery,
   determining an adjusted pump speed and an adjusted fan speed using an control function based at least in part on the battery discharge current and the ambient air temperature, and
   sending the adjusted pump speed to the pump and the adjusted fan speed to the fan to modify the pump speed and the fan speed respectively.

9. The system of claim 8, wherein the operations further comprise determining a battery surface temperature of a surface of the battery, wherein the control function is further based on the battery surface temperature.

10. The system of claim 8, wherein the operations further comprise:
receiving an indication that the battery has stopped discharging; and
in response to the indication that the battery has stopped discharging, sending control signals to the pump and the fan to stop the pump and the fan from operating.

11. The system of claim 8, wherein the control function comprises a convex function.

12. The system of claim 8, wherein the battery is a battery backup unit in a data center application.

13. The system of claim 8, wherein the optimal control function comprises an objective function that minimizes a sum of the power consumed by the pump and the power consumed by the fan in view of one or more performance constraints.

14. The system of claim 13, wherein the one or more performance constraints comprise maintaining a temperature of the battery below a threshold temperature.

15. The method of claim 6, wherein the one or more performance constraints include a battery discharging current.

16. The method of claim 6, wherein the one or more performance constraints include an ambient temperature.

17. The method of claim 6, wherein the one or more performance constraints include a battery temperature.

18. The system of claim 13, wherein the one or more performance constraints include a battery discharging current.

19. The system of claim 13, wherein the one or more performance constraints include an ambient temperature.

20. The system of claim 13, wherein the one or more performance constraints include a battery temperature.

* * * * *